United States Patent [19]
Hsu

[11] Patent Number: 5,475,215
[45] Date of Patent: Dec. 12, 1995

[54] OPTICAL COMMUNICATING APPARATUS FOR COMMUNCATING OPTICAL SIGNALS BETWEEN ELECTRONIC CIRCUTS

[76] Inventor: Winston Hsu, 14508 Pebblewood Dr., Gaithersburg, Md. 20878

[21] Appl. No.: 176,942

[22] Filed: Jan. 3, 1994

[51] Int. Cl.⁶ .................................. G02B 6/32; H01J 5/16
[52] U.S. Cl. .......................... 250/227.11; 250/551; 385/93
[58] Field of Search ............................... 250/227.11, 551; 359/152, 154, 173; 385/49, 53–55, 89, 93

[56] References Cited

U.S. PATENT DOCUMENTS

| | | | |
|---|---|---|---|
| 4,232,219 | 11/1980 | Yamamoto et al. | 250/227.11 |
| 4,614,873 | 9/1986 | Umeji | 250/227.11 |
| 4,890,894 | 1/1990 | Kwa | 350/96.20 |
| 4,903,340 | 2/1990 | Sorensen | 455/617 |
| 4,906,197 | 3/1990 | Noll | 350/96.21 |
| 4,915,466 | 4/1990 | Sorensen | 350/96.15 |
| 5,073,041 | 12/1991 | Rastani | 385/33 |
| 5,093,879 | 3/1992 | Bregman et al. | 385/93 |
| 5,133,032 | 7/1992 | Salter | 385/60 |
| 5,134,508 | 7/1992 | Corda | 359/109 |
| 5,202,567 | 4/1993 | Hamanaka | 250/551 |
| 5,212,754 | 5/1993 | Basavanhally | 385/90 |
| 5,241,612 | 8/1993 | Iwama | 385/74 |

Primary Examiner—Stephone B. Allen

[57] ABSTRACT

Optical connectors for communicating signals between electronic circuit boards and modules are devised. It comprises two matching optical connectors and each of them has a flat connector interface and a plurality of light cells for generating or receiving optical signals between the two optical connectors. High speed and high density semiconductor laser diodes and photodetectors are used to replace traditional pin-and-socket connections in the new optical connectors for signal transmission.

21 Claims, 4 Drawing Sheets

OPTICAL COMMUNICATING APPARATUS FOR COMMUNCATING OPTICAL SIGNALS BETWEEN ELECTRONIC CIRCUTS

BACKGROUND OF THE INVENTION

1. Field of the Invention

This invention relates generally to optical connectors, and more particularly, to optical connectors used between high speed backplanes and electronic modules.

2. Description of the Prior Art

High speed and high bandwidth digital transmissions between the backplanes and add-on electronic modules become more and more important for many electronic systems. Fast progress in the CPU technology has made the clock rates of most system buses increase in a dramatic speed. Besides, the improvements in digital signal processing have made it possible for computers to process not only the traditional text- or number-based applications, but also sound- and image-based multimedia applications. The need for much higher digital transmission bandwidth becomes very apparent for new electronic system applications.

Fortunately, the semiconductor and board-level packaging technologies have advanced quick enough to catch up the need for higher speed and capacity. Processors which are capable of running up to several hundreds megahertz are available for quite a while. And the multi-chip module (MCM) technology which allows many silicon dies to be bonded directly to a MCM board with high density traces in between also becomes available to the market for those high speed and high bandwidth applications. But connector interfaces between backplanes and electronic modules, or between two circuit boards, seem to be difficult to catch up with the progresses made in other fields.

There are two reasons why it is difficult for today's connector technology to catch up with the progress in semiconductor or packaging technologies. First, most of the mechanical components such as pins and sockets used in today's connectors are small enough and difficult to be shrunk again. Such mechanical parts become very difficult to manufacture or use when their sizes become too small. It is already difficult enough to make the pins of a mechanical connector down to sub-millimeter range, while it is quite normal for the semiconductor or packaging technologies to cut their circuit traces down to sub-micron or mil ranges. The result is that big and bulky connectors are still used in many advanced systems while most of the electronic circuits have shrunk into small silicon dies or MCM packages.

Second, high speed and high bandwidth digital transmissions require special care in order to maintain signal integrity. To control noise, crosstalk, reflections and distortion, high performance connectors have to be engineered as transmission lines. That demands a new level of sophistication on the part of connector and interface circuit design. Besides, many advanced electronic applications such as portable computers do not provide enough spaces for big connectors to fit in. That means new connectors for such electronic systems must be able to provide higher performance and pin-density which can be fit into smaller packages. Such requirements not only make the high performance connectors very expensive, but also cost more for the related electronic engineering efforts, manufacturing equipments and processes. Traditional pin-and-socket mechanical technology seems to have a very difficult time in such high performance connector design. Besides, there is no guarantee that such technology will work when electronic transmission speed over connecter interfaces get to the gigahertz range. New approaches must be devised to solve such problems.

SUMMARY OF THE INVENTION

It is therefore the goal of the present invention, by overcoming the limits of the prior art, to devise new connectors to achieve the following objects:

1. High density connector which can provide enough pin density to suit for the interface need of new packaging technology such as MCM.
2. High performance connector which can avoid the traditional electronic interface problems such as crosstalk, reflections, etc.

Briefly, in a preferred embodiment, the present invention includes an optical communicating apparatus for communicating signals between electronic circuit members comprising two optical connectors; each of said optical connectors comprises:

(1) at least one substantially flat connector interface for optical communications;

(2) a plurality of light cells for generating or receiving optical signals; said light cells are arranged in parallel to said connector interface; each of said light cells comprises a collimating mechanism for collimating optical signals along a designated optical path of said light cell and the designated optical paths of two matching light cells must be coupled together in order to perform optical communications; for each pair of matching light cells in said two optical connectors, one of said light cells comprises at least one light emitter and the other said light cell comprises at least one light sensor whereby optical signals can be generated and received between said two matching light cells to perform optical communications; each of said light emitter or light sensor comprises at least two electrical terminals wherein electrical signals can be converted into optical signals through said light emitter or optical signals received by said light sensor can be converted into electrical signals;

(3) a connector alignment means for aligning said light cells of both optical connectors for optical communications;

said connector alignment means of one of said optical connectors engages and removably attaches to said connector alignment means of the other optical connector with said connector interfaces of both optical connectors closely facing each other when said two optical connectors are connected together wherein said light cells of one of said optical connectors are substantially aligned with said light cells of the other optical connector along their optical paths by the help of said connector alignment means of said two optical connectors whereby optical communications can be established between said two optical connectors.

It is the advantage of the present invention that by changing the traditional electrical signal transmissions to optical signal transmissions over the connector interface, the mechanical parts used in traditional connectors such as pins and sockets can be replaced by semiconductor-based light emitters and light sensors. Because the light emitters and light sensors are placed together almost face-to-face inside a pair of matching optical connectors, each of the semiconductor light emitters and light sensors can be designed in very small format and will consume very little power. Such small power requirements can allow high speed laser diodes and sensors to be built together in very small package with semiconductor-grade density. Electronic crosstalk or reflections problems can totally be solved over such optical interfaces because electronic circuits are basically isolated by the optical connectors and only the required signals will pass through.

Construction of such optical connectors is very simple and it does not need those tiny pins and sockets components in it. Mass production of such optical connectors can be done just like other semiconductor products. Its performance and pin density can be made much higher to suit for the need of high speed and high bandwidth interfaces in new electronic systems. Besides, many new electronic functions such as on/off switches and control registers for connector configuration control can also be added to such optical connectors. All these features are impossible for traditional connectors to provide by using traditional connector technology.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE INVENTION

Figure 1:
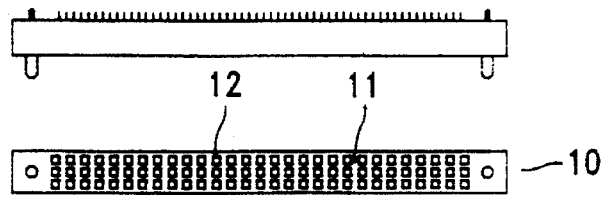
FIG. 1 is a side view and a top view of an optical connector according to the present invention.
Figure 2:
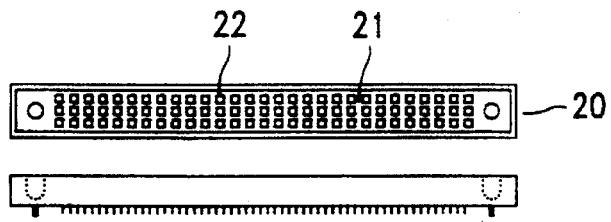
FIG. 2 is a side view and a top view of the matching optical connector according to the present invention.

FIG. 1 is a side view and a top view of an optical connector 10 according to the present invention. FIG. 2 is a side view and a top view of the matching optical connector 20 according to the present invention. In the preferred embodiment of FIG. 1 and FIG. 2, the present invention includes an optical communicating apparatus for communicating signals between electronic circuit members comprising two optical connectors 10 and 20. Each of the optical connectors 10 and 20 comprises at least one substantially flat connector interface 11 and 21 for optical communications, and a plurality of light cells 12 and 22 for generating or receiving optical signals. The light cells are arranged in parallel to the connector interface of each optical connector.

Figure 3:
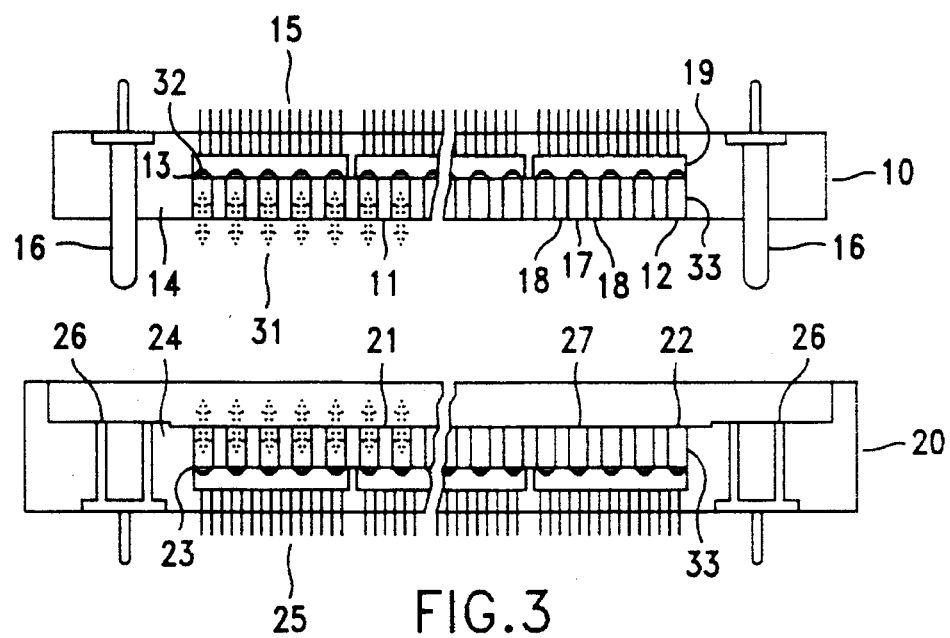
FIG. 3 is the side section views of the two optical connectors shown in FIG. 1 and FIG. 2.

FIG. 3 is the side section views of the two optical connectors 10 and 20 shown in FIG. 1 and FIG. 2. FIG. 3 shows that the optical connectors 10 and 20 have very similar constructions. The optical connector 10 comprises a panel-like light array 13. All of the light cells 12 of the optical connector 10 are built in the light array 13. The optical connector 10 further comprises a light array holder 14 for mounting the light array 13. The light array 13 is fixed to the light array holder 14 with the connector interface 11 exposed externally for optical communications. The light array holder 14 further comprises a plurality of electrical terminals 15 which are electrically connected to the light cells 12 built in the light array 13 for electrical signals to pass through. The optical connector 10 further comprises two metallic ports 16 for power transmission.

For each light cell 12 there is a designated optical path 31 for it to effectively transmit or receive optical signals. In order to perform optical communications between a pair of matching light cells, the optical paths of the two matching cells must be accurately coupled together so that optical signals can be transmitted and received along the coupled optical path of the two matching cells. FIG. 3 shows that each of the light cells 12 comprises a collimating mechanism which can collimate optical signals along the designated optical path 31 of each light cell 12. The designated optical paths of two matching light cells must be coupled together in order to perform optical communications. The collimating mechanism comprises a transparent opening 17 on the connector interface 11 for optical signals to pass through and also an opaque material 18 which wraps around each light cell 12 to restrict optical signals from transmitting in any other direction except through the transparent opening 17 whereby the designated optical path 31 of each light cell is established by the collimating mechanism.

The light cell collimating mechanisms can be made as an integral component. FIG. 3 shows that each of the two optical connectors 10 and 20 comprises a lens array 33 which is optically coupled with the light cells 12 and 22 of each optical connector to collimate optical signals for each light cell whereby optical signals generated or received by each light cell are collimated along its designated optical path by the help of the lens array 33.

Each of the light cells 12 comprises at lease one light emitter or light sensor 32 for generating or receiving optical signals. Instead of building these light emitters or light sensors 32 by using discrete components, all these light emitters or light sensors can be built in an integral IC chip by using the semiconductor IC technology such as PIN photodetector, surface-emitting LED or laser diode, etc. Very little power is needed for such light emitter or light sensor because the matching light emitters and light sensors are placed together almost face-to-face inside a pair of matching optical connectors. Such small power requirement can allow high speed and extremely low power light emitters and light sensors be built together in a very small package with semiconductor-grade density. FIG. 3 shows that the optical connector 10 comprises at least one semiconductor IC chip 19 with a plurality of light emitters or light sensors 32 built in it whereby high speed light emitters or light sensors can be built in very high density by using the semiconductor IC chip 19. Because of the sizes of most semiconductor IC chips are pretty small, it is sometimes necessary to use several semiconductor IC chips for one optical connector interface. FIG. 3 shows that the optical connector 10 comprises several semiconductor IC chips 19 to provide more light emitters and sensors to the optical connector 10.

The use of better light emitters may help alleviate the need for more complex light cell collimating mechanism. For example, laser diode has much better directional angular radiation pattern than light emitting diode. The optical signals generated from a laser diode can be made very vertical along the designated optical path of a light cell. With some collimating mechanism directly built on the surface of the light emitter by using semiconductor technology, other collimating mechanism might not be need for collimating the optical signals in a light cell.

The construction of the optical connector 20 is very similar to the optical connector 10. It comprises a panel-like light array 23 with all the light cells 22 built in it, a substantially flat connector interface 21 for optical communications, a light array holder 24 for mounting the light array 23, a plurality of electrical terminals 25, and two metallic ports 26 which will be connected to the metallic ports 16 of the optical connector 10 for power transmission.

Figure 4:
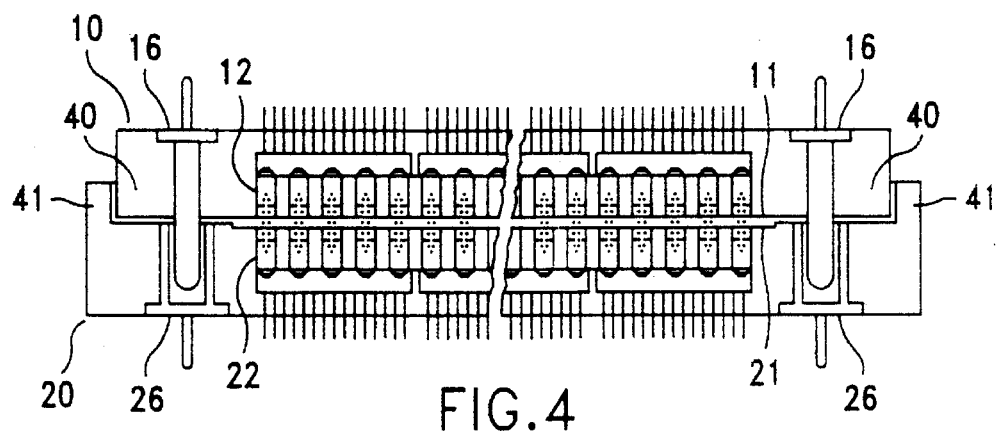
FIG. 4 is the side section view of the two optical connectors connected together.

FIG. 4 is the side section view of the two optical connectors 10 and 20 connected together. It shows that each of the optical connectors 10 and 20 comprises a connector alignment means 40 and 41 for aligning the light cells 12 and 22 of both optical connectors for optical communications. The connector alignment means 40 of the optical connector 10 engages and removably attaches to the connector alignment means 41 of the other optical connector 20 with the connector interfaces 11 and 21 of both optical connectors closely facing each other when the two optical connectors 10 and 20 are connected together wherein the light cells 12 of the optical connector 10 are substantially aligned with the light cells 22 of the other optical connector 20 by the help of the connector alignment means 40 and 41 of both optical connectors 10 and 20 whereby optical communications can be established between the two optical connectors 10 and 20.

The connector alignment mechanism is very important to an optical connector design because it will affect the density of the light emitters which can be placed in an optical connector. The size of a surface emitting laser diode is around 100 microns (0.1 millimeter), which is about the same as the acceptable tolerance of many high precision connectors used today. A pair of matching light emitter and light sensor are usually positioned within 4 mm or even shorter in a pair of matching optical connectors. It will be difficult to align such small light emitter and light sensor accurately along their optical paths with such connector tolerance. One method to solve this problem is to expand the light cell size, for example, to 0.5 millimeter, and use the collimating mechanism to disperse optical signals throughout both matching light cells. This method will solve the light cell alignment problem, but will also drop the density of the light cells because less light cells can be built in the same connector interface. One method to solve this problem is to put multiple light emitters and sensors in one light cell and use different spectral ranges for each pair of light emitters and light sensors so that multiple communications can be made within each light cell. And this will be discussed in FIG. 6.

The connector alignment means 40 and 41 can also serve as the latching means to latch the two optical connectors 10 and 20 together. That means the connector alignment means 40 of the optical connector 10 is a latching means and the connector alignment means 41 of the other optical connector 20 is a correspondent latch receiving means wherein the latching means 40 of the optical connector 10 engages and removably latches to the latch receiving means 41 of the other optical connector 20 when the two optical connectors are connected together whereby the two optical connectors can be tightly latched together to perform optical communications.

Figure 5:
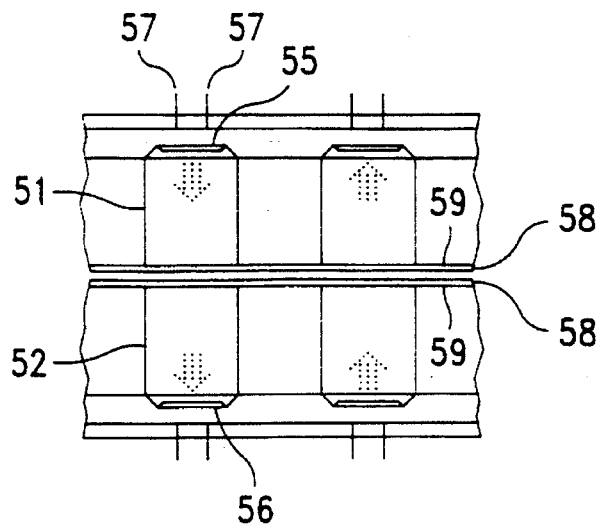
FIG. 5 is the side section view of the construction of two pairs of matching light cells equipped with a single light emitter or light sensor in each light cell.

The two connector interfaces 11 and 21 of these two optical connectors 10 and 20 are separated apart with a tiny gap in between when these two optical connectors are connected together whereby scratches or other physical damages to the connector interfaces 11 and 21 from direct contacting can thus be avoided. If there is no gap between these two connector interfaces 11 and 21, any plug-in or pull-out action may cause some scratches over both connector interfaces 11 and 21 and eventually it will make both of the connector interfaces useless for optical communications. Accidental touch to the optical connector interface may also cause such problem. One method to alleviate this problem is to apply a scratch-resistent coating on the optical connector interface. FIG. 5 will show the detail construction of such coating over the connector interfaces.

The gap between two matching optical connectors should be made as thin as possible because it may cause light dispersion and thus greatly reduce the coupling efficiency between each pair of matching light cells if it is too wide. Besides, external dust and light may get into the gap and affect the optical communications. It is necessary to shield this gap to prevent it. FIG. 4 shows that the connector alignment means 41 of the optical connector 20 comprises a protruding edge around its connector interface 21 and the connector alignment means 40 of the other optical connector 10 comprises a correspondent receiving edge around its connector interface 11 wherein the protruding edge 41 of the optical connector 20 engages and removably attaches to the correspondent receiving edge 40 of the other optical connector 10 when these two optical connectors 10 and 20 are connected together whereby optical communications between these two optical connectors are protected by the protruding edge 41 from external light or dust.

The optical signal transmissions may help to solve the problems of high speed electrical signal transmission, but it is not so effective to transmit electrical power like what the traditional pin-and-socket connector does. Power transmission in the new optical connector design still utilize the traditional pin-and-socket solution. FIG. 4 shows that the optical connector 10 comprises two metallic ports 16 and the other optical connector 20 comprises two correspondent metallic ports 26 wherein the metallic ports 16 of the optical connector 10 engage and removably attach to the correspondent metallic ports 26 of the optical connector 20 for power transmission when these two optical connectors 10 and 20 are connected together.

FIG. 5 is the side section view of the construction of two pairs of matching light cells equipped with a single light emitter or light sensor in each light cell. In order to perform optical communications, a pair of light emitter and light sensor must be equipped in two matching light cells. FIG. 5 shows that for each pair of matching light cells in the two optical connectors such as the light cells 51 and 52, the light cell 51 comprises a light emitter 55 and the other light cell 52 comprises a light sensor 56 whereby optical signals can be generated and received between these two matching light cells 51 and 52 to perform optical communications. The light emitter 55 or light sensor 56 comprises at least two electrical terminals 57 wherein electrical signals can be converted into optical signals through the light emitter 55 or optical signals received by the light sensor 56 can be converted into electrical signals.

The optical connector users may plug in or pull out an optical connector frequently. It is very possible that some external dust or pollutants may attach to the connector interface of an optical connector. Such dust or pollutants may block optical signals and affect the optical communications between two matching light cells. If the connector interface can be designed as a flat surface, it will be very easy for an optical connector user to clean it before he plugs such optical connector to its socket. FIG. 5 illustrates such a flat connector interface design. It shows that the connector interfaces 58 of both optical connectors are two flat surfaces whereby dust or pollutants attached to anyone of them can easily be cleaned.

Any accidental touch or contact to the connector interface of an optical connector may also cause some scratches or damages to it. Such scratches or damages may also block optical signals and affect the optical communications between two matching light cells. One method to solve this problem is to apply a protective coating on the surface of an optical connector interface, just like the protective coating applied on the plastic lenses of eye glasses. FIG. 5 shows that each connector interface 58 of these two optical connectors comprises a transparent layer 59 on its surface and the transparent layer 59 is made of scratch-resistant material whereby the connector interface 58 can be protected by the transparent layer 59 from possible scratches.

Figure 6:
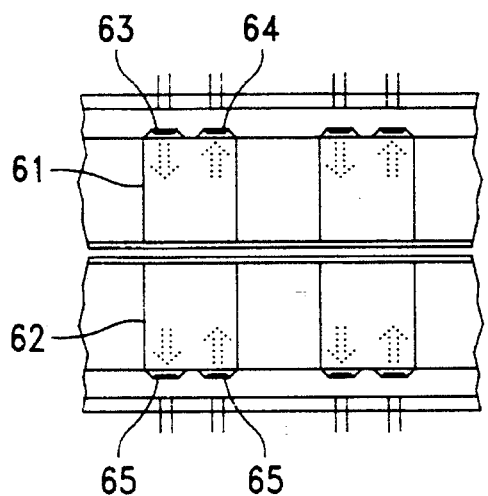
FIG. 6 is the side section view of the construction of two pairs of matching light cells equipped with both light emitter and light sensor in each light cell.

FIG. 6 is the side section view of the construction of two pairs of matching light cells equipped with both light emitter and light sensor in each light cell. Optical signals can be transmitted in both directions within such matching light cells. It shows that the light cell 61 comprises at least one light emitter 63 and one light sensor 64, and the other matching light cell 62 also comprises at least one light emitter 65 and one light sensor 66 wherein optical signals generated by any of these two matching light cells can be received by the other light cell whereby optical signals can be transmitted in both directions.

If it is necessary to transmit optical signals in both directions in the same time, the interference problem may happen between these two matching light cells 61 and 62. The size of each light cell is very small and any optical signal generated by each light emitter can brighten both of the matching light cells and thus can be received by both of the light sensors 64 and 66 in the same time. Such interference will make the full duplex transmission impossible. One method to solve this problem is to use different spectral ranges for different matching pairs of light emitter/light sensor so that individual light sensor will only "see" optical signals within its spectral range and all the other optical signals will become invisible to it. That means for each of the two matching light cells 61 and 62 in FIG. 6, if the emitting spectral range of the light emitter is different from the receiving spectral range of the light sensor in the same light cell, then optical signals generated from each light emitter will not be received by the light sensor in the same light cell. And optical signals generated from the two light emitters 63 and 65 of these two matching light cells 61 and 62 can be transmitted in the same time without interfering with each other. This method will not only make full duplex transmission possible, but also allows multiplex transmissions in both directions.

Figure 7:
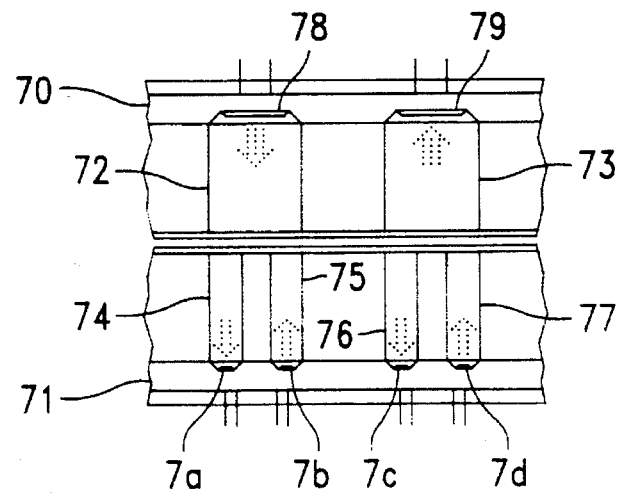
FIG. 7 is the side section view of the construction of two pairs of matching light cells with different light cell sizes.

FIG. 7 is the side section view of the construction of two pairs of matching light cells with different light cell sizes. It shows that the light cell 72 of the optical connector 70 is matched with two light cells 74 and 75 of the other optical connector 71 whereby optical communications between these two optical connectors 70 and 71 can still be established even if the light cell sizes of these two optical connectors are not the same.

Connectors with different pin counts while still compatible with each other is a very important requirement for some industrial standard connectors such as VL-BUS or EISA which are both ISA compatible. It is also possible to provide such compatibility to optical connectors with different light cell sizes such as the two matching optical connectors 70 and 71 in FIG. 7. Optical signals generated by the light emitter 78 of the optical connector 70 can be received by the light sensor 7a of the other optical connector 71. And optical signals generated by the light emitter 7d of the optical connector 71 can be received by the light sensor 79 of the other optical connector 70. The light emitter 7b and the light sensor 7c of the optical connector 71 is not used in this case.

Figure 8:
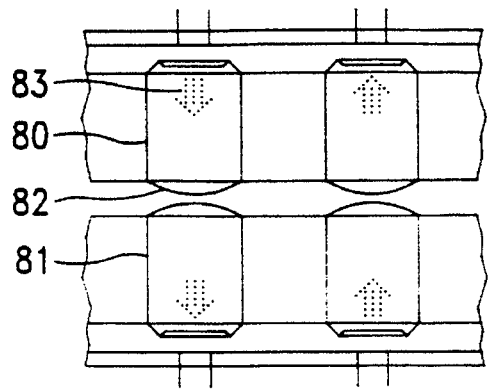
FIG. 8 is the side section view of the construction of two pairs of matching light cells equipped with a convex lens on the transparent opening of each light cell.

FIG. 8 is the side section view of the construction of two pairs of matching light cells equipped with a convex lens on the transparent opening of each light cell. Coupling efficiency between two matching light cells is very important because optical signals generated by a light emitter may disperse to many other directions during the transmission instead of being completely received by the designated light sensor. One method to improve the coupling efficiency is to use convex lens to collimate the optical signals along the designated optical path of each light cell. FIG. 8 shows that the collimating mechanism of the light cell 80 comprises a convex lens 82 to collimate optical signals along its designated optical path 83 whereby coupling efficiency between the matching light cells 80 and 81 can be highly increased by using the convex lens 82.

Figure 9:
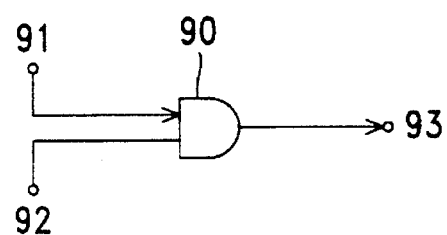
FIG. 9 is the logic circuit diagram of a control switch which controls the connection or disconnection of the electrical signal path to a light emitter.
Figure 10:
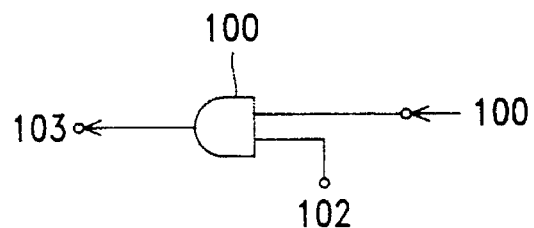
FIG. 10 is the logic circuit diagram of a control switch which controls the connection or disconnection of the electrical signal path from a light sensor.

FIG. 9 is the logic circuit diagram of a control switch which controls the connection or disconnection of the electrical signal path to a light emitter and FIG. 10 is the logic circuit diagram of a control switch which controls the connection or disconnection of the electrical signal path from a light sensor. Since the light emitters and light sensors can be easily implemented by using semiconductor IC chips in optical connectors, it is quite natural that many electronic functions can also be implemented to such optical connectors by adding various electronic circuits to each semiconductor IC chip.

One important function is the on and off control of individual light cells within one optical connector. If an optical connector can be turned off by an electronic system when there is no electronic module connected to it and automatically turned on by the electronic system after one electronic module is installed, then live insertion of electronic modules to an electronic system can very easily be implemented by such optical connectors which have on/off switches installed. The other example is BUS segmentation. In FIG. 7 the optical connector 70 is connected to the optical connector 71 which has twice the number of light cells of the optical connector 70. If all of the unused light cells such as 75 and 77 can be turned off by the electronic system, all the electronic signal lines connected to those unused light cells can then be isolated and used for other purposes.

FIG. 9 and FIG. 10 show two simple AND gate logic circuits for controlling a light emitter and a light sensor. FIG. 9 shows that an AND gate logic circuit is used to control the signal flow from an external electronic circuit to a light emitter. The AND gate 90 has two inputs: electronic signal line 91 from an external electronic circuits and the switch control line 92 which will control the on and off of the AND gate 90. When the switch control line 92 is set to "0", no signal from line 91 will pass the AND gate 90 until it is changed to "1". The output signal line 93 will be connected to a light emitter where electronic signals will be converted into optical signals.

FIG. 10 shows that an AND gate logic circuit is used to control the signal flow from a light sensor to an external electronic circuit. The AND gate 100 has two inputs: electronic signal line 101 from the light sensor and the switch control line 102 which will control the on and off of the AND gate 100. When the switch control line 102 is set to "0", no signal from line 101 will pass the AND gate 100 until it is changed to "1". The output signal line 103 will be connected to an external electronic circuit.

FIG. 9 and FIG. 10 show a light emitter or light sensor in a light cell can be equipped with a control switch which can connect or disconnect the electrical signal path of a light emitter or light sensor whereby the use of the light emitter or light sensor can be controlled by the control switch.

Figure 11:
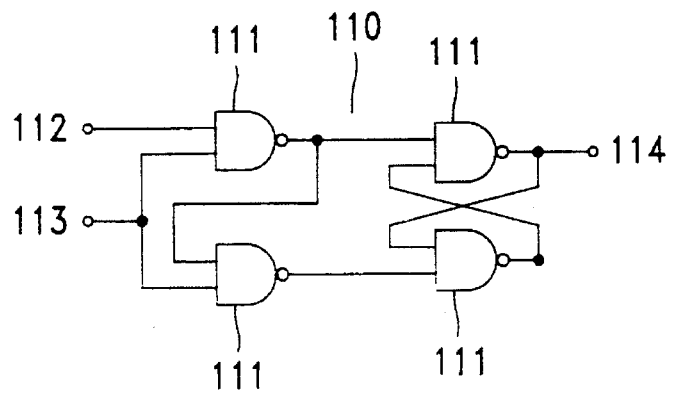
FIG. 11 is the logic circuit diagram of a D flip-flop which keeps the 0/1 information in its memory for controlling the control switch in FIG. 9 or FIG. 10.

FIG. 11 is the logic circuit diagram of a D flip-flop which keeps the 0/1 information in its memory for controlling the control switch in FIG. 9 or FIG. 10. It shows that a light emitter or light sensor can further be equipped with a control register to control the control switch whereby the use of the light emitter or light sensor can be programmed externally by using the control register. The D flip-flop 110 comprises four NAND gates 111 and two input lines: the switch control input line 112 and D flip-flop control line 113. Its output line 114 is connected to line 92 in FIG. 9 or line 102 in FIG. 10 for switch control. The logic operation of the D flip-flop 110 is very simple. When the D flip-flop control line 113 is set to "1", the input from the switch control input line 112 will be kept by the D flip-flop 110 and also passed to its output line 114. When the D flip-flop control line is set to "0", no input will be accepted by the D flip-flop 110 from the switch control input line 112. The memory status of the D flip-flop 110 will remain the same until it is changed by both of the input lines 112 and 113. And the status of the output line 114 is the same as the internal status of the D flip-flop 110. An optical connector with a plurality of light emitters and sensors can design a connector control register in its semiconductor IC chip by using multiple D flip-flop logic circuits for the control of each light emitter or light sensor. The on and off of each light emitter or light sensor can thus be externally programmed by an external electronic circuit by using the connector control register. Numerous electronic applications can thus be developed by using such external configurable optical connectors.

Figure 12:
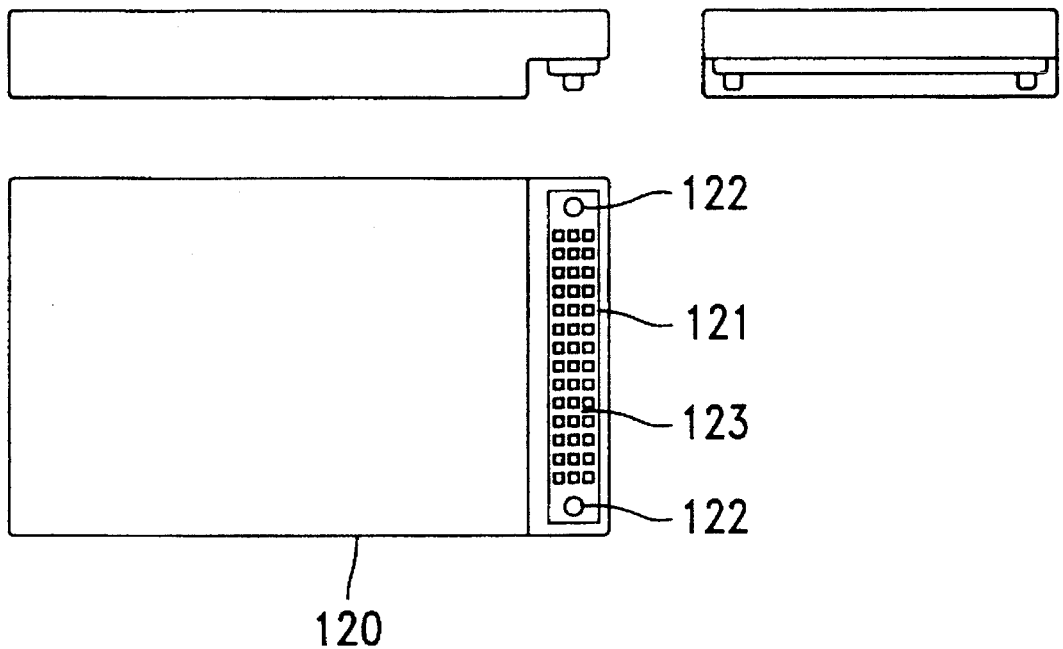
FIG. 12 shows the front, side and bottom views of a hard disk drive module with an optical connector installed on its front end according to this invention.

FIG. 12 shows the front, side and bottom views of a hard disk drive module with an optical connector installed on its front end according to this invention. Electronic modules which need high speed digital I/O interface such as hard disk drive, CPU module, modem, LAN adapter, etc. can all use the optical connectors as their interfaces. FIG. 12 shows a hard disk module 120 with an optical connector 121 installed on its front end. The optical connector 121 further comprises two metallic ports 122 which can transmit electrical power to the hard disk module 120. Optical connectors installed on such portable modules may easily be damaged if the module is accidentally dropped to a concrete ground or surface. The two protruding metallic ports 122 on two opposite sides of the connector interface 123 of the optical connector 121 can be used to prevent it from contacting concrete surfaces when the optical connector is not connected to the other optical connector whereby the connector interface 123 of the optical connector 121 can partially be protected by the protruding ports 122 from dropping or direct contacting.

Figure 13:
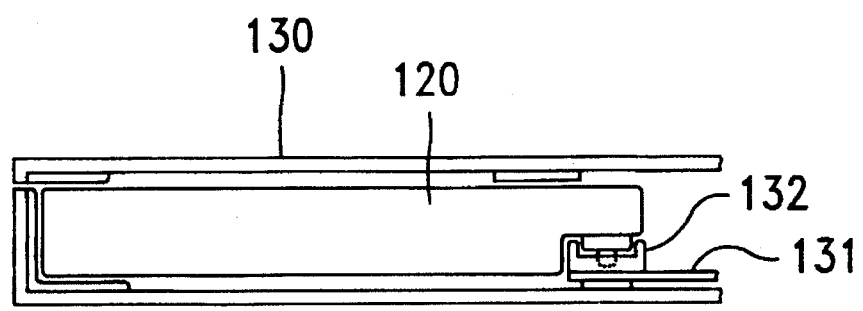
FIG. 13 shows that the hard disk drive module in FIG. 12 is mounted inside a case and connected to an electronic circuit member which has a matching optical connector installed.

FIG. 13 shows that the hard disk drive module 120 in FIG. 12 is mounted inside a case 130 and connected to an electronic circuit member 131 which has a matching optical connector 132 installed. The optical connector 132 is soldered to the electronic circuit member 131 whereby high speed electrical signals can be easily transmitted between the optical connector 132 and the electronic circuit member 131.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

I claim:

1. An optical communicating apparatus for communicating signals between electronic circuit members comprising two optical connectors, each of said optical connectors comprising:

(1) at least one substantially flat connector interface for optical communications;

(2) a plurality of light cells for generating or receiving optical signals, said light cells arranged in parallel to said connector interface, each of said light cells comprising a collimating mechanism for collimating optical signals along a designated optical path of said light cell, the designated optical paths of two matching light cells of said two optical connectors coupled together for performing optical communications, one of said matching light cells comprising at least one light emitter and the other said matching light cell comprising at least one light sensor whereby optical signals can be generated and received between said two matching light cells to perform optical communications, each of said light emitter or light sensor comprising at least two electrical terminals wherein electrical signals can be converted into optical signals through said light emitter or optical signals received by said light sensor can be converted into electrical signals, said light emitter or light sensor of one of said matching light cells further comprising a control switch for controlling said light emitter or light sensor whereby the use of said light emitter or light sensor can be controlled by said control switch; and (3) a connector alignment means for aligning said light cells of both optical connectors for optical communications wherein said connector alignment means of one of said optical connectors engages and removably attaches to said connector alignment means of the other optical connector with said connector interfaces of both optical connectors closely facing each other when said two optical connectors are connected together;

wherein said light cells of one of said optical connectors are substantially aligned with said light cells of the other optical connector by the help of said connector alignment means of said two optical connectors whereby optical communications can be established between said two optical connectors.

2. An optical communicating apparatus of claim 2 wherein:

said light emitter or light sensor further comprises at least one control register to control said control switch whereby the use of said light emitter or light sensor can be programmed externally by using said control register.

3. An optical communicating apparatus of claim 1 wherein:

one of said two matching light cells comprises at least one light emitter and one light sensor, and the other matching light cell also comprises at least one light emitter and one light sensor wherein optical signals generated by any of said two matching light cells can be received by the other said light cell whereby optical signals can be transmitted in both directions.

4. An optical communicating apparatus of claim 3 wherein:

for each of said two matching light cells the emitting spectral range of said light emitter is different from the receiving spectral range of said light sensor in the same light cell wherein optical signals generated from said light emitter will not be received by said light sensor in the same light cell whereby optical signals generated from said two light emitters of said two matching light cells can be transmitted in the same time without interfering with each other.

5. An optical communicating apparatus of claim 1 wherein:

said light cell of one of said two optical connectors is matched with at least two light cells of the other optical connector whereby optical communications between said two optical connectors can still be established even if the light cell sizes of said two optical connectors are not the same.

6. An optical communicating apparatus of claim 1 wherein:

said connector alignment means of one of said optical connectors is a latching means and said connector alignment means of the other said optical connector is a correspondent latch receiving means wherein said latching means of the former optical connector engages and removably latches to said latch receiving means of the latter optical connector when said two optical connectors are connected together whereby said two optical connectors can be tightly latched together to perform optical communications.

7. An optical communicating apparatus of claim 1 wherein:

said connector alignment means of one of said optical connectors comprises a protruding edge around its connector interface and said connector alignment means of the other said optical connector comprises a correspondent receiving edge around its connector interface wherein said protruding edge of the former optical connector engages and removably attaches to the correspondent receiving edge of the latter optical connector when said two optical connectors are connected together whereby optical communications between said two optical connectors are protected by said protruding edge from external light or dust.

8. An optical communicating apparatus of claim 1 wherein:

said two connector interfaces of said two optical connectors are separated apart with a tiny gap in between when said two optical connectors are connected together whereby scratches or other physical damages to said connector interfaces from direct contacting can thus be avoided.

9. An optical communicating apparatus of claim 1 wherein:

one of said optical connectors further comprises at least two metallic ports and the other said optical connector further comprises two correspondent metallic ports wherein said two metallic ports of the former optical connector engage and removably attach to the correspondent metallic ports of the latter optical connector for power transmission when said two optical connectors are connected together.

10. An optical communicating apparatus of claim 1 wherein:

one of said optical connectors further comprises two protruding ports on two opposite sides of its connector interface to prevent it from contacting concrete surfaces when said optical connector is not connected to the other optical connector whereby said connector interface of said optical connector can partially be protected by said protruding ports from dropping or direct contacting.

11. An optical communicating apparatus of claim 1 wherein:

at least one of said optical connectors comprises a panel-like light array and all of said light cells of said optical connector are built in said light array;

said optical connector further comprises a light array holder for mounting said light array wherein said light array is fixed to said light array holder with said connector interface exposed externally for optical communications;

said light array holder further comprises a plurality of electrical terminals which are electrically connected to said light cells built in said light array for electrical signals to pass through.

12. An optical communicating apparatus of claim 1 wherein:

at least one of said optical connectors comprises at least one semiconductor IC chip with a plurality of said light emitters or light sensors built in it whereby high speed light emitters or light sensors can be built in very high density by using said semiconductor IC chip.

13. An optical communicating apparatus of claim 12 wherein:

said light emitter of said semiconductor IC chip is a surface emitting semiconductor LED or laser diode.

14. An optical communicating apparatus of claim 1 wherein:

said connector interface of one of said optical connectors further comprises a transparent layer on its surface and said transparent layer is made of scratch-resistent material whereby said connector interface is further protected by said transparent layer from possible scratches.

15. An optical communicating apparatus of claim 1 wherein:

said connector interface is a flat surface whereby dust or pollutants attached to said connector interface can easily be cleaned.

16. An optical communicating apparatus of claim 1 wherein:

one of said optical connectors is further soldered to an electronic circuit member whereby high speed electrical signals can be easily transmitted between said optical connector and said electronic circuit member.

17. An optical communicating apparatus of claim 1 wherein:

said collimating mechanism of one of said light cells comprises a transparent opening on said connector interface for optical signals to pass through and also an opaque material which wraps around said light cell to restrict optical signals from transmitting in any other direction except through said transparent opening whereby said designated optical path of said light cell is established by said collimating mechanism.

18. An optical communicating apparatus of claim 1 wherein:

said collimating mechanism of one of said two matching light cells comprises a convex lens to collimate optical signals along its designated optical path whereby coupling efficiency between said two matching light cells can be highly increased by using said convex lens.

19. An optical communicating apparatus of claim 1 wherein:

one of said optical connectors further comprises a lens array which is optically coupled with said light cells of said optical connector to collimate optical signals for each light cell whereby optical signals generated or received by each light cell are collimated along its designated optical path by the help of said lens array.

20. An optical communicating apparatus for communicating signals between electronic circuit members comprising two optical connectors, each of said optical connectors comprising:

(1) at least one substantially flat connector interface for optical communications;

(2) a plurality of light cells for generating or receiving optical signals, said light cells arranged in parallel to said connector interface, each of said light cells comprising a collimating mechanism for collimating optical signals along a designated optical path of said light cell, the designated optical paths of two matching light cells of said two optical connectors coupled together for performing optical communications, one of said two matching light cells comprising at least one light emitter for generating optical signals in one spectral range and the other said matching light cell comprising at least one light sensor for receiving optical signals in said spectral range whereby optical signals of said spectral range can be generated and received between said two matching light cells to perform optical communications, said two matching light cells further comprising another pair of light emitter and light sensor for performing optical communications by using a different spectral range whereby optical signals generated by said two light emitters of said two matching light cells can be transmitted in the same time without interfering with each other, each of said light emitters or light sensors comprising at least two electrical terminals wherein electrical signals can-be converted into optical signals through said light emitter or optical signals received by said light sensor can be converted into electrical signals; and (3) a connector alignment means for aligning said light cells of both optical connectors for optical communications wherein said connector alignment means of one of said optical connectors engages and removably attaches to said connector alignment means of the other optical connector with said connector interfaces of both optical connectors closely facing each other when said two optical connectors are connected together;

wherein said light cells of one of said optical connectors are substantially aligned with said light cells of the other optical connector by the help of said connector alignment means of said two optical connectors whereby optical communications can be established between said two optical connectors.

21. An optical communicating apparatus for communicating signals between electronic circuit members comprising two optical connectors, each of said optical connectors comprising:

(1) at least one substantially flat connector interface for optical communications;

(2) a plurality of light cells for generating or receiving optical signals, said light cells arranged in parallel to said connector interface, each of said light cells comprising a collimating mechanism for collimating optical signals along a designated optical path of said light cell, the designated optical paths of two matching light cells of said two optical connectors coupled together for performing optical communications, one of said matching light cells comprising one light emitter and the other said matching light cell comprising one light sensor whereby optical signals can be generated and received between said matching light cells to perform optical communications, each of said light emitter or light sensor comprising at least two electrical terminals wherein electrical signals can be converted into optical signals through said light emitter or optical signals received by said light sensor can be converted into electrical signals, one of said matching light cells of one optical connector matched with at least two matching light cells of the other optical connector whereby optical communications between said two optical connectors still can be established even when the light cell sizes of said two optical connectors are not the same; and (3) a connector alignment means for aligning said light cells of both optical connectors for optical communications wherein said connector alignment means of one of said optical connectors engages and removably attaches to said connector alignment means of the other optical connector with said connector interfaces of both optical connectors closely facing each other when said two optical connectors are connected together;

wherein said light cells of one of said optical connectors are substantially aligned with said light cells of the other optical connector by the help of said connector alignment means of said two optical connectors whereby optical communications can be established between said two optical connectors.

* * * * *